(12) United States Patent
Dale et al.

(10) Patent No.: US 8,745,134 B1
(45) Date of Patent: Jun. 3, 2014

(54) CROSS SOCIAL NETWORK DATA AGGREGATION

(75) Inventors: Scott Dale, San Francisco, CA (US); Nathan Brown, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 270 days.

(21) Appl. No.: 13/077,440

(22) Filed: Mar. 31, 2011

Related U.S. Application Data

(60) Provisional application No. 61/449,559, filed on Mar. 4, 2011.

(51) Int. Cl.
*G06F 15/16* (2006.01)

(52) U.S. Cl.
USPC ........... 709/204; 709/201; 709/202; 709/217; 709/218; 709/219; 709/223; 709/226

(58) Field of Classification Search
USPC ......... 709/201, 202, 217, 218, 219, 223, 226, 709/204
See application file for complete search history.

(56) References Cited

U.S. PATENT DOCUMENTS

| | | | |
|---|---|---|---|
| 6,769,068 B1 | 7/2004 | Brozowski et al. | |
| 7,370,335 B1 | 5/2008 | White et al. | |
| 7,565,494 B1 | 7/2009 | Todd et al. | |
| 7,657,652 B1 | 2/2010 | Balaji | |
| 7,673,327 B1 * | 3/2010 | Polis et al. | 726/5 |
| 7,769,395 B2 | 8/2010 | Fiatal et al. | |
| 7,801,971 B1 * | 9/2010 | Amidon et al. | 709/217 |
| 7,827,208 B2 * | 11/2010 | Bosworth et al. | 707/802 |
| 7,974,983 B2 * | 7/2011 | Goeldi | 707/769 |
| 8,078,741 B2 * | 12/2011 | Barnfield et al. | 709/229 |
| 8,086,253 B1 | 12/2011 | Kalamkar et al. | |
| 8,171,114 B1 | 5/2012 | Dale et al. | |
| 8,276,190 B1 | 9/2012 | Chang et al. | |
| 8,296,784 B1 | 10/2012 | Brown et al. | |
| 8,311,531 B2 | 11/2012 | Haaparanta et al. | |
| 8,332,488 B1 | 12/2012 | Dale et al. | |
| 8,347,322 B1 | 1/2013 | Brown et al. | |
| 8,352,969 B2 | 1/2013 | Brown et al. | |

(Continued)

OTHER PUBLICATIONS

"U.S. Appl. No. 13/077,466, Notice of Allowance mailed Aug. 8, 2012", 11 pgs.

(Continued)

*Primary Examiner* — Liangche A Wang
(74) *Attorney, Agent, or Firm* — Schwegman Lundberg & Woessner, P.A.

(57) ABSTRACT

Disclosed in one example is a system for providing social networking data including a data store configured to store a user profile associated with a first user and may include a user identification, a first and second social networking user identifier for a first and second social networking service, a first and second connection between a second and third user on the first and second social networking services respectively. The system includes a response module to respond to a request for information from a social networking application with at least a portion of the profile associated with the first user if it is present in the data store. If the profile is not present in the data store, the response module may create a new profile associated with the first user and add it to the data store. The system also includes a synchronization module that may periodically request updated information from the first or second social networking services for the first user and to use the updated information to update the profile associated with the first user.

21 Claims, 11 Drawing Sheets

(56) References Cited

U.S. PATENT DOCUMENTS

| | | | |
|---|---|---|---|
| 8,352,970 | B2 | 1/2013 | Brown et al. |
| 8,386,250 | B2 | 2/2013 | Lloyd et al. |
| 8,429,277 | B2 | 4/2013 | Dale et al. |
| 8,438,231 | B2 | 5/2013 | Cai et al. |
| 8,522,137 | B1 | 8/2013 | Brown et al. |
| 8,549,073 | B2 | 10/2013 | Dale et al. |
| 2002/0065899 | A1 | 5/2002 | Smith et al. |
| 2003/0018670 | A1 | 1/2003 | Ashford et al. |
| 2004/0268231 | A1 | 12/2004 | Tunning |
| 2005/0193332 | A1 | 9/2005 | Dodrill et al. |
| 2005/0216550 | A1* | 9/2005 | Paseman et al. ............. 709/202 |
| 2006/0143303 | A1 | 6/2006 | Serenyi et al. |
| 2006/0265689 | A1 | 11/2006 | Kuznetsov et al. |
| 2007/0150603 | A1 | 6/2007 | Crull et al. |
| 2007/0300258 | A1 | 12/2007 | O'Connor et al. |
| 2008/0182563 | A1* | 7/2008 | Wugofski et al. .......... 455/414.2 |
| 2009/0016504 | A1 | 1/2009 | Mantell et al. |
| 2009/0049525 | A1 | 2/2009 | D'Angelo et al. |
| 2009/0187865 | A1 | 7/2009 | Brownholtz et al. |
| 2009/0199275 | A1* | 8/2009 | Brock et al. ...................... 726/4 |
| 2009/0292814 | A1 | 11/2009 | Ting et al. |
| 2009/0307332 | A1 | 12/2009 | Litwin |
| 2010/0010866 | A1 | 1/2010 | Bal et al. |
| 2010/0077045 | A1 | 3/2010 | Bercu et al. |
| 2010/0100952 | A1 | 4/2010 | Sample et al. |
| 2010/0114788 | A1* | 5/2010 | White et al. ................. 705/319 |
| 2010/0144788 | A1 | 6/2010 | Stensbol et al. |
| 2010/0199340 | A1 | 8/2010 | Jonas et al. |
| 2010/0217869 | A1 | 8/2010 | Esteban et al. |
| 2010/0223341 | A1 | 9/2010 | Manolescu et al. |
| 2010/0235578 | A1 | 9/2010 | Sih et al. |
| 2010/0274815 | A1* | 10/2010 | Vanasco ....................... 707/798 |
| 2010/0281216 | A1 | 11/2010 | Patel et al. |
| 2010/0306099 | A1 | 12/2010 | Hirson et al. |
| 2011/0022580 | A1 | 1/2011 | Badulescu et al. |
| 2011/0023101 | A1 | 1/2011 | Vernal et al. |
| 2011/0040844 | A1* | 2/2011 | Lawler et al. ................. 709/206 |
| 2011/0047182 | A1 | 2/2011 | Shepherd et al. |
| 2011/0055333 | A1* | 3/2011 | Guy et al. ..................... 709/206 |
| 2011/0113073 | A1* | 5/2011 | Chang .......................... 707/803 |
| 2011/0113094 | A1 | 5/2011 | Chunilal |
| 2011/0145270 | A1 | 6/2011 | Christopher et al. |
| 2011/0145512 | A1 | 6/2011 | Adl-Tabatabai et al. |
| 2011/0153759 | A1 | 6/2011 | Rathod |
| 2011/0154445 | A1 | 6/2011 | Schmidt-Karaca et al. |
| 2011/0161478 | A1 | 6/2011 | Formo et al. |
| 2011/0162038 | A1 | 6/2011 | Chunilal |
| 2011/0173397 | A1 | 7/2011 | Boyle et al. |
| 2011/0179161 | A1* | 7/2011 | Guy et al. ..................... 709/224 |
| 2011/0219190 | A1 | 9/2011 | Ng et al. |
| 2011/0231489 | A1 | 9/2011 | Rathod |
| 2011/0238755 | A1 | 9/2011 | Khan et al. |
| 2011/0238766 | A1 | 9/2011 | Lew et al. |
| 2011/0239282 | A1 | 9/2011 | Svarfvar et al. |
| 2011/0251898 | A1 | 10/2011 | Scott et al. |
| 2011/0251970 | A1 | 10/2011 | Oien et al. |
| 2011/0270685 | A1 | 11/2011 | Marks et al. |
| 2012/0054631 | A1 | 3/2012 | Nurmi et al. |
| 2012/0072494 | A1 | 3/2012 | Wong et al. |
| 2012/0143973 | A1 | 6/2012 | Nieuwerth |
| 2012/0158715 | A1 | 6/2012 | Maghoul et al. |
| 2012/0173383 | A1 | 7/2012 | Badawiyeh et al. |
| 2012/0184363 | A1 | 7/2012 | Barclay et al. |
| 2012/0202587 | A1 | 8/2012 | Allen et al. |
| 2012/0214564 | A1 | 8/2012 | Barclay et al. |
| 2012/0215538 | A1 | 8/2012 | Cleasby et al. |
| 2012/0221645 | A1 | 8/2012 | Anthru et al. |
| 2012/0221962 | A1 | 8/2012 | Lew et al. |
| 2012/0226749 | A1 | 9/2012 | Dale et al. |
| 2012/0226759 | A1 | 9/2012 | Lew et al. |
| 2012/0227086 | A1 | 9/2012 | Dale et al. |
| 2012/0227087 | A1 | 9/2012 | Brown et al. |
| 2012/0246245 | A1 | 9/2012 | Nilsson |
| 2012/0254902 | A1 | 10/2012 | Brown et al. |
| 2012/0254903 | A1 | 10/2012 | Brown et al. |
| 2012/0254904 | A1 | 10/2012 | Brown et al. |
| 2013/0006602 | A1 | 1/2013 | Zhu et al. |
| 2013/0024949 | A1 | 1/2013 | Baldwin et al. |
| 2013/0326372 | A1 | 12/2013 | Angell et al. |

OTHER PUBLICATIONS

"U.S. Appl. No. 13/077,466, Supplemental Amendment filed May 31, 2012", 10 pgs.

"U.S. Appl. No. 13/244,878, Notice of Allowance mailed Jul. 17, 2012", 5 pgs.

"U.S. Appl. No. 13/244,888, Final Office Action mailed Jul. 6, 2012", 10 pgs.

"U.S. Appl. No. 13/244,894, Final Office Action mailed Jul. 6, 2012", 20 pgs.

"U.S. Appl. No. 13/244,938 , Response filed Aug. 21, 2012 to Final Office Action mailed May 21, 2012", 11 pgs.

"U.S. Appl. No. 13/244,941 , Response filed Aug. 21,2012 to Final Office Action mailed May 21,2012", 8 pgs.

"U.S. Appl. No. 13/244,942, Notice of Allowance mailed Jun. 4, 2012", 11 pgs.

"Facebook Markup Language (FBML)", [Online]. Retrieved from the Internet: <URL: developers.facebook.com/docs/reference/fbml/>, (Accessed Aug. 17, 2012).

"Vinehub Login", Vinehub, 2011, [Online]. Retrieved from the Internet: <URL: http://www.vinehub.com/index.php/login/>, (Accessed Aug. 22, 2012), 1 pg.

"Vinehub: Frequently Asked Questions", Vinehub, 2011, [Online]. Retrieved from the Internet: <URL: http://www.vinehub.com/index.php/pp./faq/>, (Accessed on Aug. 22, 2012), 1 pg.

"U.S. Appl. No. 13/190,281, Non Final Office Action mailed Nov. 9, 2012", 34 pgs.

"U.S. Appl. No. 13/244,888, Non Final Office Action mailed Nov. 14, 2012", 10 pgs.

"U.S. Appl. No. 13/244,938, Notice of Allowance mailed Oct. 16, 2012", 7 pgs.

"U.S. Appl. No. 13/244,941, Notice of Allowance mailed Oct. 16, 2012", 7 pgs.

"U.S. Appl. No. 13/077,394, Examiner Interview Summary mailed Feb. 8, 2012", 3 pgs.

"U.S. Appl. No. 13/077,394, Non Final Office Action Mailed Dec. 22, 2011", 16 pgs.

"U.S. Appl. No. 13/077,394, Notice of Allowance mailed May 23, 2012", 7 pgs.

"U.S. Appl. No. 13/077,394, Response filed Mar. 22, 2012 to Non Final Office Action mailed Dec. 22, 2011", 15 pgs.

"U.S. Appl. No. 13/077,466, Non Final Office Action mailed Feb. 16, 2012", 6 pgs.

"U.S. Appl. No. 13/077,466, Response filed May 16, 2012 to Office Action mailed Feb. 16, 2012", 10 pgs.

"U.S. Appl. No. 13/244,878, Non Final Office Action mailed Jan. 30, 2012", 8 pgs.

"U.S. Appl. No. 13/244,878, Notice of Allowance mailed May 11, 2012", 5 pgs.

"U.S. Appl. No. 13/244,878, Preliminary Amendment filed Dec. 16. 2011", 3 pgs.

"U.S. Appl. No. 13/244,878, Response filed Apr. 30, 2012 to Non Final Office mailed Jan. 30, 2012", 10 pgs.

"U.S. Appl. No. 13/244,885, Examiner Interview Summary mailed Feb. 24, 2012", 1 pg.

"U.S. Appl. No. 13/244,885, Notice of Allowance mailed Feb. 24, 2012", 13 pgs.

"U.S. Appl. No. 13/244,885, Preliminary Amendment filed Dec. 12, 2011", 3 pgs.

"U.S. Appl. No. 13/244,888, Examiner Interview Summary mailed Apr. 9, 2012", 4 pgs.

"U.S. Appl. No. 13/244,888, Non Final Office Action mailed Feb. 29, 2012", 9 pgs.

"U.S. Appl. No. 13/244,888, Preliminary Amendment filed Dec. 12, 2011", 3 pgs.

"U.S. Appl. No. 13/244,888, Response filed Apr. 30, 2012 to Non Final Office Action mailed Feb. 29, 2012", 11 pgs.

(56) References Cited

OTHER PUBLICATIONS

"U.S. Appl. No. 13/244,894, Examiner Interview Summary mailed Mar. 5, 2012", 3 pgs.

"U.S. Appl. No. 13/244,894, Non Final Office Action mailed Dec. 9, 2011", 16 pgs.

"U.S. Appl. No. 13/244,894, Response filed Feb. 16, 2012 to Non Final Office Action mailed Dec. 9, 2011", 13 pgs.

"U.S. Appl. No. 13/244,938, Examiner Interview Summary mailed Feb. 7, 2012", 3 pgs.

"U.S. Appl. No. 13/244,938, Final Office Action mailed May 21, 2012", 17 pgs.

"U.S. Appl. No. 13/244,938, Non Final Office Action mailed Dec. 22, 2011", 18 pgs.

"U.S. Appl. No. 13/244,938, Response filed Mar. 22, 2012 to Non Final Office Action mailed Dec. 22, 2012", 15 pgs.

"U.S. Appl. No. 13/244,941, Examiner Interview Summary mailed Feb. 8, 2012", 3 pgs.

"U.S. Appl. No. 13/244,941, Final Office Action mailed May 21, 2012", 12 pgs.

"U.S. Appl. No. 13/244,941, Non Final Office Action mailed Dec. 21, 2012", 15 pgs.

"U.S. Appl. No. 13/244,941, Response filed Mar. 21, 2012 to Non Final Office Action mailed Dec. 21, 2011", 12 pgs.

"U.S. Appl. No. 13/244,942, Examiner Interview Summary mailed Feb. 7, 2012", 3 pgs.

"U.S. Appl. No. 13/244,942, Non Final Office Action mailed Dec. 22, 2011", 18 pgs.

"U.S. Appl. No. 13/244,942, Response filed Mar. 22, 2012 to Non Final Office Action mailed Dec. 22, 2011", 14 pgs.

"OpenSocial: Frequently Asked Questions", Google.com, 2011 [retrieved on Dec. 9, 2011]. Retrieved from <http://code.google.com/apis/opensocial/faq.html>, 2 pgs.

"Social network aggregation", Wikipedia.org, Nov. 11, 2011 [retrieved on Dec. 6, 2011]. Retrieved from <http://en.wikipedia.org/wiki/Social network_aggregation>, 3 pgs.

"Socialstream", [Online]. Carnegie Mellon University HCII, 2006. [retrieved on Dec. 6, 2011]. Retrieved from <http://www.hcii.cmu.edu/M-HCI/2006/SocialstreamProject/socialstream.php>, 2 pgs.

"SocialStream", [Online Video]. Carnegie Mellon University HCII, 2006. [retrieved on Apr. 30, 2012]. Retrieved from the Internet: <URL: http://www.hcii.cmu.edu/M-HCI/2006/SocialstreamProject/Socialstream_demo.mov > (5 minutes, 6 seconds) 29.0 MB.

"Socialstream Features", [Online]. Carnegie Mellon University HCII, 2006. [retrieved on Dec. 6, 2011]. Retrieved from Internet: <http://www.hcii.cmu.edu/M-HCI/2006/SocialstreamProject/features.php>, 3 pgs.

"Storage Media", Microsoft Computer Dictionary, Fifth Edition, Microsoft Press, (2002), p. 499.

"The OAuth 1.0 Protocol", E. Hammer-Lahav (ed.), Internet Engineering Task Force (IETF), Request for Comments: 5849, Category: Informational, ISSN: 2070-1721, (Apr., 2010), 38 p.

"The OAuth 2.0 Authorization Protocol", E. Hammer-Lahav et al. (eds.), draft-ietf-oauth-v2-13, Network Working Group, Obsoletes: 5849 (if approved), Intended status: Standards Track, (Feb. 16, 2011), 44 p.

"Vinehub Login", Vinehub, 2011 [retrieved on Dec. 6, 2011]. Retrieved from <http://www.vinehub.com/index.php/login/>, 1 pg.

"Vinehub: Frequently Asked Questions", Vinehub, 2011 [retrieved on Dec. 6, 2011]. Retrieved from < http://www.vinehub.com/index.php/pages/faq/>, 1 pg.

"Web Application Toolkit for Social Network APIs", Microsoft, Jul. 15, 2010 [retrieved on Dec. 9, 2011]. Retrieved from <URL: http://archive.msdn.microsoft.com/watsocial, 2 pgs.

Brown, Nathan, et al., "Social Network Applicaiton Programming Interface", U.S. Appl. No. 13/244,942, Application Filed Sep. 26, 2011, 59 pgs.

Brown, Nathan, et al., "Social Network Application Programming Interface", U.S. Appl. No. 13/244,942, Application Filed Sep. 26, 2011, 59 pgs.

Brown, Nathan, "Social Network Application Programming Interface", U.S. Appl. No. 13/077,394, Application, filed Mar. 31, 2011, 51 pgs.

Brown, Nathan, "Social Network Application Programming Interface", U.S. Appl. No. 13/244,941, Application Filed Sep. 26, 2011, 58 pgs.

Morin, Dave, "Announcing Facebook Connect", [online]. Facebook, May 9, 2008 [retrieved on Feb. 14, 2012]. Retrieved from <developers.facebook.com/blog/post/108/ >, 2 pgs.

Mulligan, Catherine, "Open API Standardisation For The NGN Platform", Proceedings of the First ITU-T Kaleidoscope Academic Conference, (2008), 8 pgs.

Perez, Sarah, "Vinehub: New Social Network Connector to Aggregate, Update Multiple Services", ReadWriteWeb, May 20, 2010 [retrieved on Dec. 6, 2011]. Retrieved from <http://www.readwriteweb.com/archives/vinehub_new_social_network_connector_to_aggregate_update_multiple_services.php#.TuJLoUXQb3o.email>, 3 pgs.

Schroeder, S., "20 Ways to Aggregate Your Social Networking Profiles", mashable.com, Jul. 17, 2007. Retrieved from <http://mashable.com/2007/07/17/social-network-aggregators/>, 8 pgs.

"U.S. Appl. No. 13/077,394, Notice of Allowance mailed Sep. 10, 2012", 7 pgs.

"U.S. Appl. No. 13/190,281, Examiner Interview Summary mailed Aug. 29, 2012", 2 pgs.

"U.S. Appl. No. 13/244,888, Response filed Oct. 8, 2012 to Final Office Action mailed Jul. 6, 2012", 11 pgs.

"U.S. Appl. No. 13/244,894, Response filed Oct. 9, 2012 to Final Office Action mailed Jul. 6, 2012", 11 pgs.

"U.S. Appl. No. 13/244,942, Corrected Notice of Allowance mailed Aug. 24, 2012", 4 pgs.

"U.S. Appl. No. 13/077,411 , Response filed May 1, 2013 to Non Final Office Action mailed Dec. 6, 2012", 16 pgs.

"U.S. Appl. No. 13/077,411, Final Office Action mailed Aug. 27, 2013", 20 pgs.

"U.S. Appl. No. 13/077,411, Non Final Office Action mailed Dec. 6, 2012", 20 pgs.

"U.S. Appl. No. 13/190,281 , Response filed Apr. 9, 2013 to Non Final Office Action mailed Nov. 9, 2012", 20 pgs.

"U.S. Appl. No. 13/190,281, Notice of Allowance mailed May 10, 2013", 10 pgs.

"U.S. Appl. No. 13/244,878, Notice of Allowance mailed Feb. 13, 2013", 5 pgs.

"U.S. Appl. No. 13/244,888 , Response filed Apr. 15, 2013 to Non Final Office Action mailed Nov. 14, 2012", 15 pgs.

"U.S. Appl. No. 13/244,888, Notice of Allowance mailed Jul. 19, 2013", 15 pgs.

"U.S. Appl. No. 13/680,176, Non Final Office Action mailed Sep. 12, 2013", 6 pgs.

"U.S. Appl. No. 13/077,425, Non Final Office Action mailed Oct. 9, 2013", 15 pgs.

U.S. Appl. No. 13/077,411, Response filed Jan. 22, 2014 to Final Office Action dated Aug. 27, 2013, 17 pgs.

U.S. Appl. No. 13/680,176, Response filed Jan. 13, 2014 to Non-Final Office Action dated Sep. 12, 2013, 8 pgs.

U.S. Appl. No. 13/077,425, Response filed Feb. 10, 2014 to Non-Final Office Action dated Oct. 9, 2013, 12 pgs.

U.S. Appl. No. 13/680,176, Notice of Allowance mailed Feb. 5, 2014, 10 pgs.

* cited by examiner

CROSS SOCIAL NETWORK DATA AGGREGATION

CLAIM OF PRIORITY

This patent application claims the benefit of priority, under 35 U.S.C. Section 119(e), to U.S. Provisional Patent Application Ser. No. 61/449,559, entitled "CROSS SOCIAL NETWORK DATA AGGREGATION," filed on Mar. 4, 2011 to Scott Dale et al., which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Zynga, Inc. 2011, All Rights Reserved.

BACKGROUND

A social networking service is an online service, platform or site that allows members to build or reflect social networks or social relations among members. Typically, members construct profiles, which may include personal information such as name, contact information, employment information, photographs, personal messages, status information, links to web related content, blogs, and so on. Typically, only a portion of a member's profile may be viewed by the general public, and/or other members.

The social networking site allows members to identify and establish links or connections with other members in order to build or reflect social networks or social relations among members. For instance, in the context of a business networking service, a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member then has the option of accepting or declining the invitation. If the second member accepts the invitation, the first and second members are connected.

In general, a connection or link may represent or may be otherwise associated with an information access privilege, such that a first person who has established a connection with a second person is, via the establishment of that connection, authorizing the second person to view or access non-publicly available portions of their profiles. Of course, depending on the particular implementation of the business/social networking service the nature and type of the information that may be shared, as well as the granularity with which the access privileges may be defined to protect certain types of data may vary greatly.

A variety of different social networking services have gained popularity, include FACEBOOK® of Palo Alto, Calif., MYSPACE® of Beverly Hills, Calif. and run by News Corp., LINKEDIN® of Mountain View, Calif., TWITTER® of San Francisco, Calif., and the like. These sites often allow for third party applications to utilize certain functionality provided by the host social networking service. In some examples, these third party applications may utilize certain user interface (UI) elements of the social networking service, access personal information about a user (including profile information), and send and receive social interactions, such as messages, to the user of the third party application or to their connections. FACEBOOK®, for example, allows developers to create applications which are integrated into the FACEBOOK® user interface and with the FACEBOOK® social networking system. In some examples, these applications may include games such as CITYVILLE®, FARMVILLE®, and MAFIA WARS®, all developed by ZYNGA®, Inc. of San Francisco, Calif. These applications appear in a FACEBOOK® page, and make use of various features of FACEBOOK®, such as contacting friends to encourage them to join the game and play with the user and the like.

The social networking services integrate with these applications by providing to these applications an Application Programming Interface or "API." In general, an API is a particular set of rules and specifications that a software program may follow to access and make use of the services and resources provided by another particular software program that implements that API. The API serves as an interface between different software programs and facilitates their interaction.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Social networking applications derive some of their popularity from the social nature of their gameplay. Users may invite and participate in the games with their social networking service connections. However, because individuals are often members of multiple social networking services, social networking applications utilizing the APIs of the host social networking service only receive part of the picture about a given user of a social networking service. This is because the profiles of these users are often not the same across all their constituent social networking services. For example, a given user may be connected to a first group of other users on one social networking site, but may be connected to a second group of other users on another social networking site. The first and second groups may have some common members, but may also have some different members. The social networking service may not know about the members included in one group but not the other. This represents a missed opportunity to enhance gameplay for the various users. Disclosed, is a system, method and machine readable medium for aggregating social networking information from multiple users and making it available to a social networking application.

Figure 1:
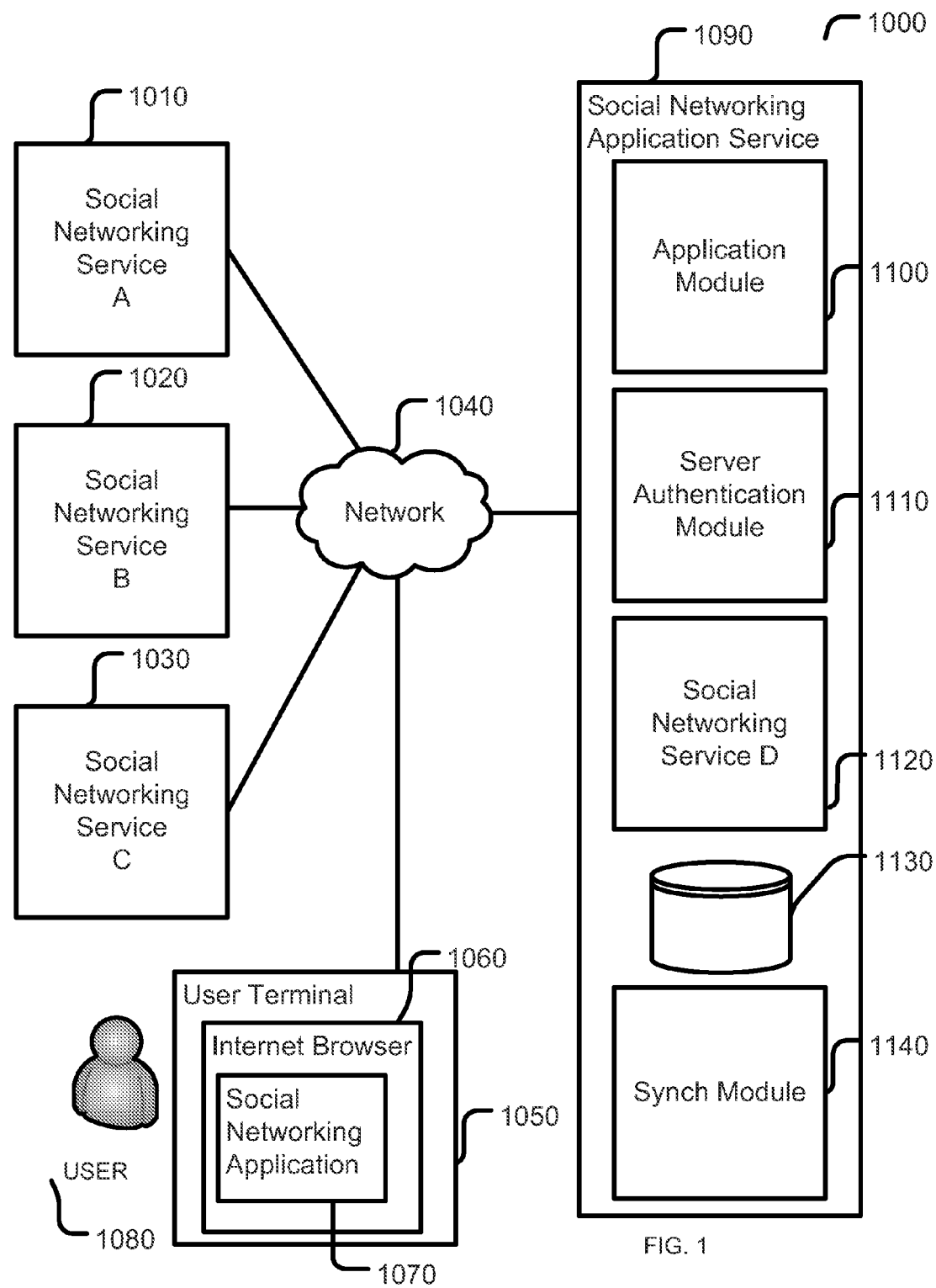
FIG. 1 is a block diagram illustrating social networking services, a network, a user terminal and a social networking application service according to one example of the present disclosure.

FIG. 1 shows one example social networking application system 1000. Typically a user, such as user 1080 will access and communicate with one or more social networking services 1010-1030, 1120 through network 1040. In some examples, social networking services 1010-1030 may include FACEBOOK®, MYSPACE®, LINKEDIN®, TWITTER®, and the like. In some examples, this communication may be done through the user terminal 1050. User terminal 1050, in some examples, may include a personal computer (PC), laptop computer, tablet computer, smart phone or other cellular telephone, electronic book reader, or any other device that allows a user to access the functionality of the social networking service. In some examples, an internet browser 1060 of the user terminal 1050 is used to access the social networking services 1010-1030 using network 1040. Internet browser 1060, in some examples, may include Internet Explorer® from Microsoft Corp., Redmond, Wash. Network 1040 may be any method by which user terminal 1050 may communicate with one or more social networking services 1010-1030. In some examples, network 1040 may include the interact, a wide area network "WAN", local area network "LAN", cellular network, or any other method of allowing the user terminal 1050 to connect with the social networking service, and the like. While four social networking services are shown in FIG. 1 (1010-1030, 1120), it will be appreciated by those skilled in the art that the system and methods of the current disclosure are applicable to more or less than four social networks.

Typically, when a user 1080 accesses a third party application (such as a game) associated with one of the social networking services 1010-1030, 1120, the user 1080 selects the application via the social networking service 1010-1030, 1120, which then re-directs the user to access the application on another server. In some examples, this server may be located on a social networking application service 1090. The user's browser connects to the application server, downloads the application client, then displays or executes the application. In some examples, this social networking application 1070 may be or include HTML or XML, JavaScript, Adobe flash, Microsoft Silverlight, and the like. The social network 1010-1030 from which the user selected the content may be called the host social network. The user's browser then executes or displays this social networking application 1070 until the user 1080 decides to exit, or the application closes or otherwise ends.

In some examples, while the application 1070 executes, it communicates with the host social networking service to which it is associated. Example communications include authenticating, authorizing, utilizing the user interface elements of the host social network, obtaining social network information about user 1080 (such as connections with other users), sending messages to other users, and the like.

In some examples, social networking application 1070 may communicate with social networking application service 1090. Social networking application service 1090 may include various functions to assist social networking application 1070. In some examples, social networking application service 1090 may include application module 1100, which stores and delivers to user terminals (including user terminal 1050) social networking application 1070 from data store 1130. In other examples, application module 1100 may contain execution logic for social networking application 1070. Examples of this execution logic include responding to user actions and inputs; payment and purchasing information for purchasing the application or unlocking, accelerating, or making available various features in the application 1070; sending messages to and from various other users of the application; storing application data in data store 1130; providing various media files such as graphics, video, and sound files; and the like. While social networking application service 1090 is shown in FIG. 1 as one system, the components and the functionality of social networking application service 1090 could be distributed across multiple systems.

In some examples, social networking application service 1090 includes a server authentication module 1110, which works with client authentication module 2010 (FIG. 2) to authenticate/authorize social networking application 1070 with a variety of social networking services 1010-1030.

In some examples, social networking application service 1090 includes social networking service D 1120. Social networking service D 1120 is another social networking service that is associated with the social networking application service. In some examples, social networking service D is run by social networking application service 1090 and thus is more tightly coupled to social networking application service 1090 than social networking services 1010-1030. In some examples, social networking service D may provide a common framework for storing all the user 1080's personal information that may be stored across social networking services 1010-1030 in one central profile.

In some examples, instead of social networking application 1070 contacting the various social networks 1010-1030 for information regarding user 1080 or their connections, social networking application 1070 may contact social networking service D 1120. Social networking service D 1120 in some cases may aggregate all the known information regarding user 1080 that has been collected from social networking services 1010-1030 by or on behalf of social networking application 1070 and also information collected by other social networking applications utilizing social networking service D 1120. Multiple social networking applications 1070 running on different social networking services 1010-1030 may interface with social networking service D 1120, passing it information about a particular user or users, as well as authentication and authorization information. This authentication and authorization information allows social networking service D 1120 to obtain additional information about those users, and to periodically update that information by request from the various social networking services. In some cases, contacting social networking service D 1120 may be faster than contacting the host social networking service for the information, and may provide more complete information about the user to the social networking application. In some examples, the social networking service D 1120 creates a profile for these users and stores the aggregate information in the profile.

Synch module 1140 may maintain a queue of users whose profiles need to be updated by requesting updated information from the various social networking services 1010-1030. In some examples, a user is placed on the queue the first time the system becomes aware of the user. In other examples, a user is placed on the queue upon logging in to the social networking service D. In other examples, a user is placed in the queue when the social networking service D 1120 learns that the user is a connection of another user. In other examples, each user's profile may be refreshed after a certain amount of time. In other examples, user 1080 may be utilizing social networking application 1070 for a long enough time period that the system will queue the information refresh in order to ensure that social networking service D 1120 has up-to-date information in case social networking application 1070 needs it.

The information obtained by social networking service D 1120 may include connection lists, profile information such as name, address, phone number, email, photos, message postings, and any other information in the member's profile or associated with that member on the social networking service.

Figure 2:
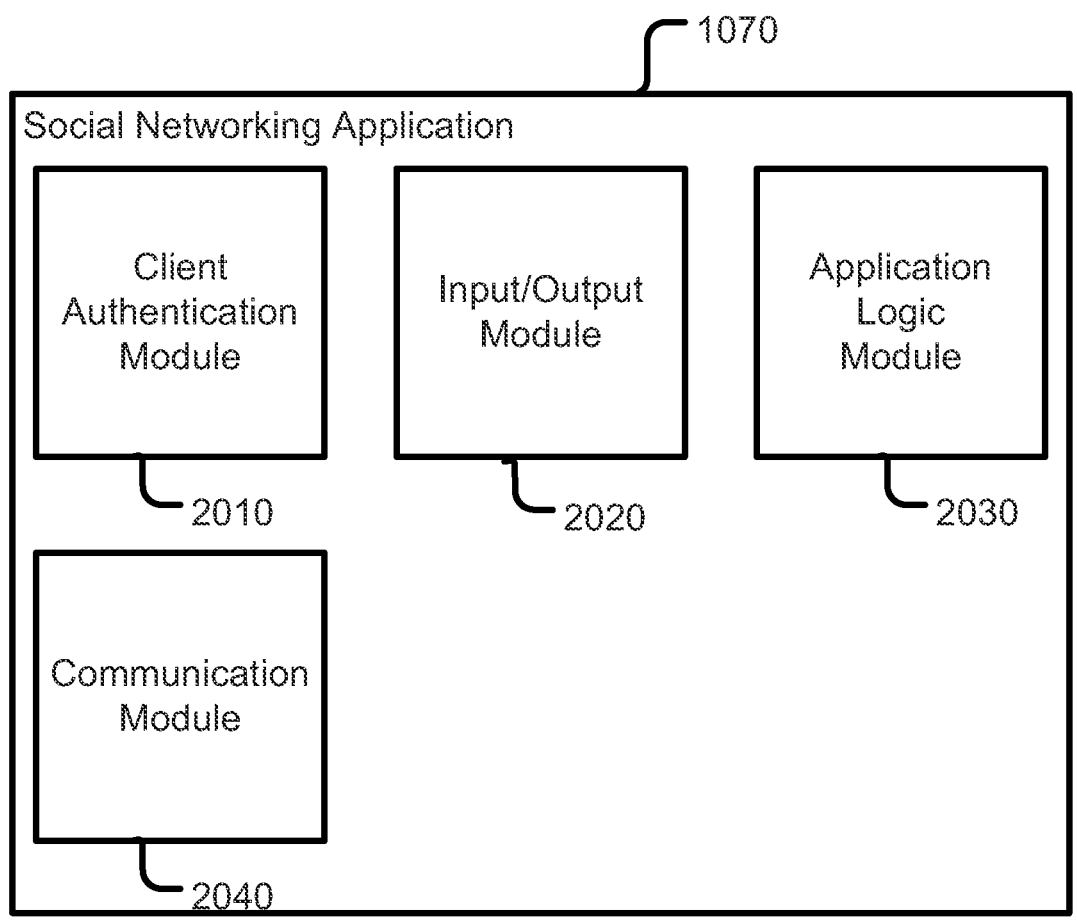
FIG. 2 is a block diagram illustrating a social networking application according to one example of the present disclosure.

One example social networking application 1070 is shown in FIG. 2. A social networking application 1070 is any application which utilizes, or is capable of utilizing, the API of one or more social networking services. In some examples social networking application 1070 may contain an input/output module 2020. Input/output module 2020 communicates with the user 1080, through user terminal 1050. Input/output module 2020 is responsible for causing the user interface of the social networking application 1070 to be displayed and for handling user inputs.

Application logic module 2030, in some examples, is responsible for implementing the primary functions of the social networking application 1070. For example, in the case of a game, the game logic and the game rules are implemented by application logic module 2030. In some examples, application logic module 2030 communicates with application module 1100 using communication module 2040 to communicate changes in application state, user interactions, and to receive instructions for processing application events. In other examples, application logic module 2030 has all the logic necessary to process any application state changes, user interactions and handling application events. In yet other examples, application logic module 2030 has the logic necessary for handling some application state changes, user interactions and application events while the remaining functionality is handled by application module 1100.

Communication module 2040 communicates with social networking service 1010-1030 and social networking application service 1090. In some examples, this communication may include network communication across network 1040. A variety of methods of communication may be used, including AJAX, page loads, other HTTP communications, TCP sockets, UDP datagrams, and the like.

Social networking application may include a client authentication module 2010 for managing authentication with one or more social networking services 1010-1030. Client authentication module 2010 may work with server authentication module 1100 of social networking application service 1090 to authenticate and authorize with the various social networks 1010-1030. Authentication and authorization, in some examples, includes user authentication—which informs the social networking service and the application associated with the social networking service the identity of the user, authorization—in which the user authorizes the social networking application 1070 to access certain personal information and take certain actions, application authentication—which allows the social networking service to verify that a trusted application is asking for access and to provide the requested level of access; and the like. In some examples, authentication and authorization with the social network are necessary to utilize various APIs of the social networking services 1010-1030, 1120. In some examples, when a user launches social networking application 1070, client authentication module 2010 authenticates and authorizes the social networking application 1070 with the host social networking service. The host social networking service may then pass back authentication information. In some examples, this authentication information may be a token key that identifies a session. Client authentication module 2010 then passes this authentication information to server authentication module 1110, which stores this information for later use by other social networking applications, including other social networking applications that are hosted on different social networking services, and in some examples, by social networking application service 1090 and social networking service D 1120. In general, the authentication information may include any information necessary to utilize an application programming interface on a social networking service.

Server authentication module 1110 of social networking application service 1090 receives this authentication information and in some cases, it may store this in social networking service D 1120 in user 1080's profile such that social networking service D 1120 may make API calls for the various social networking services 1010-1030 that a user is associated with. In other examples, authentication module 1100 may be part of social networking service D 1120.

Figure 3:
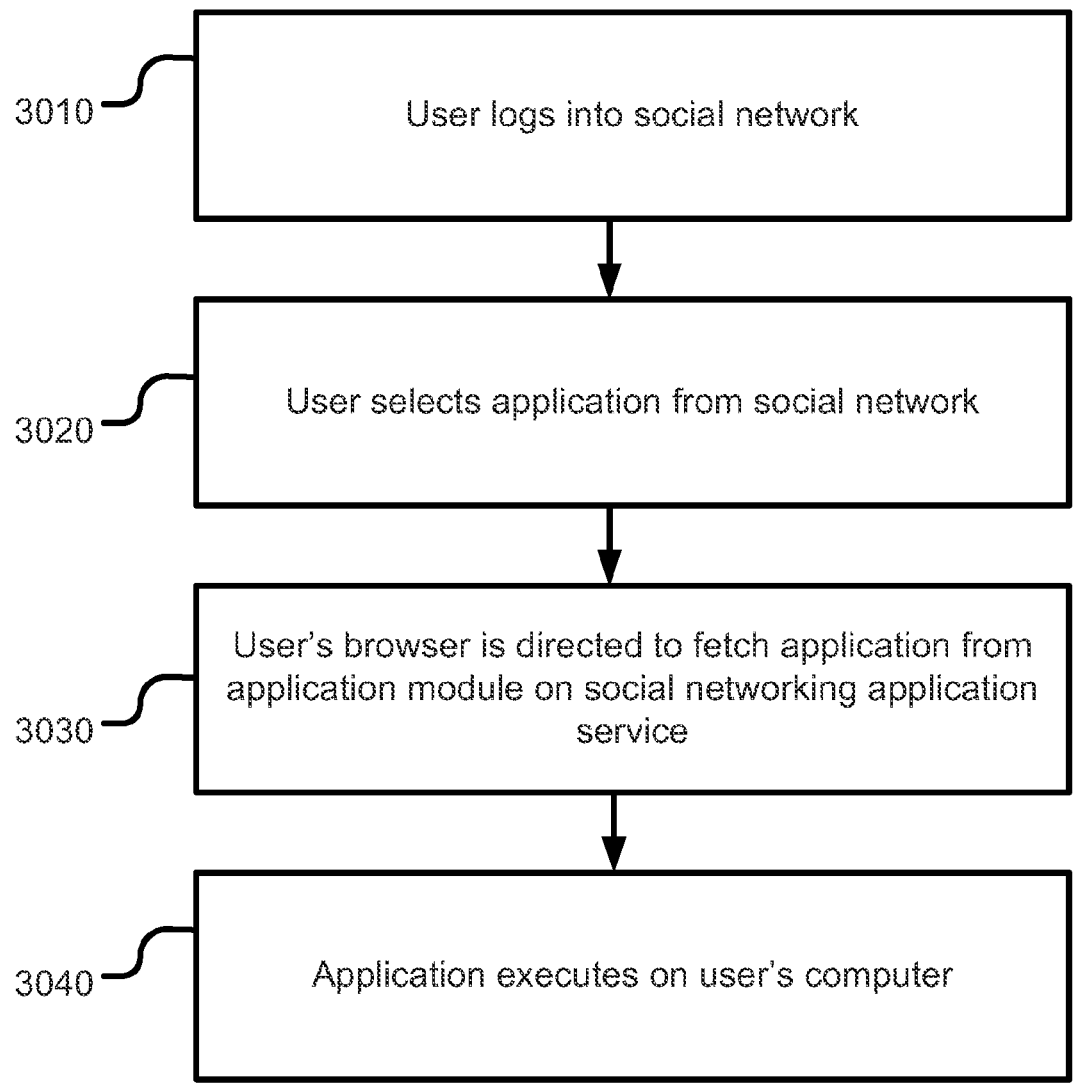
FIG. 3 is a flow chart illustrating a method to launch a social networking application according to one example of the present disclosure.

FIG. 3 shows one example method of the present disclosure. At 3010, a user logs onto a social networking service 1010-1030. Usually, this requires the user to enter certain identification and authentication information. In some examples, this may be a username and a password. At operation 3020, the user selects an application from the social network. In some examples, the application may be a game, productivity application such as a word processor, a spreadsheet, messaging application, marketplace application, media application, dating application, and any other application that may be associated with a social networking service. In some examples, a social networking application can be any application that may utilize a social networking application service API. In other examples, the user may visit social networking application service 1090, which may then prompt the user 1080 to login to one of the social networking services 1010-1030 through the use of certain authentication and authorization APIs provided by social networking services 1010-1030.

At operation 3030, the user's browser is directed by the social networking service to fetch or download an application from an application module 1100 on a social networking application service 1090. In operation 3040, the application executes on a user's computer or terminal 1050. In some examples, the application is displayed in an IFRAME HTML element.

Figure 4:
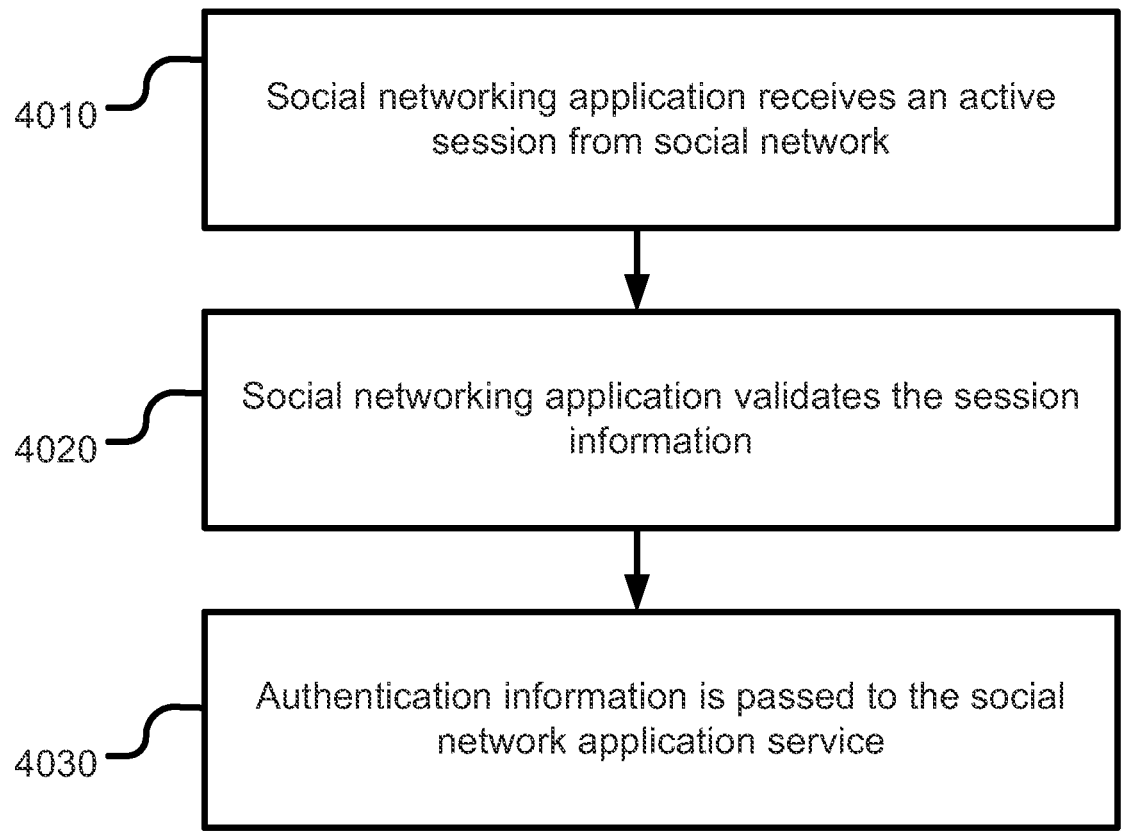
FIG. 4 is a flow chart illustrating a method of sending authentication information to the social networking application service according to one example of the present disclosure.

Turning now to FIG. 4, at operation 4010, the social networking application client authentication module 2010 authenticates and authorizes with the host social networking service, receiving authentication information in return.

In some examples, this social networking application client authentication module 2010 validates the session information at operation 4020 by ensuring that the authentication information has not expired and is correctly formed. At operation 4030, the authentication information may then be passed to the social network application service server authentication module 1110 in order to store the session information in order to allow the social networking application service 1090 and the social networking service D 1120 to make API calls to other social networks, and in return provide faster access to the social networking data.

Figure 5:
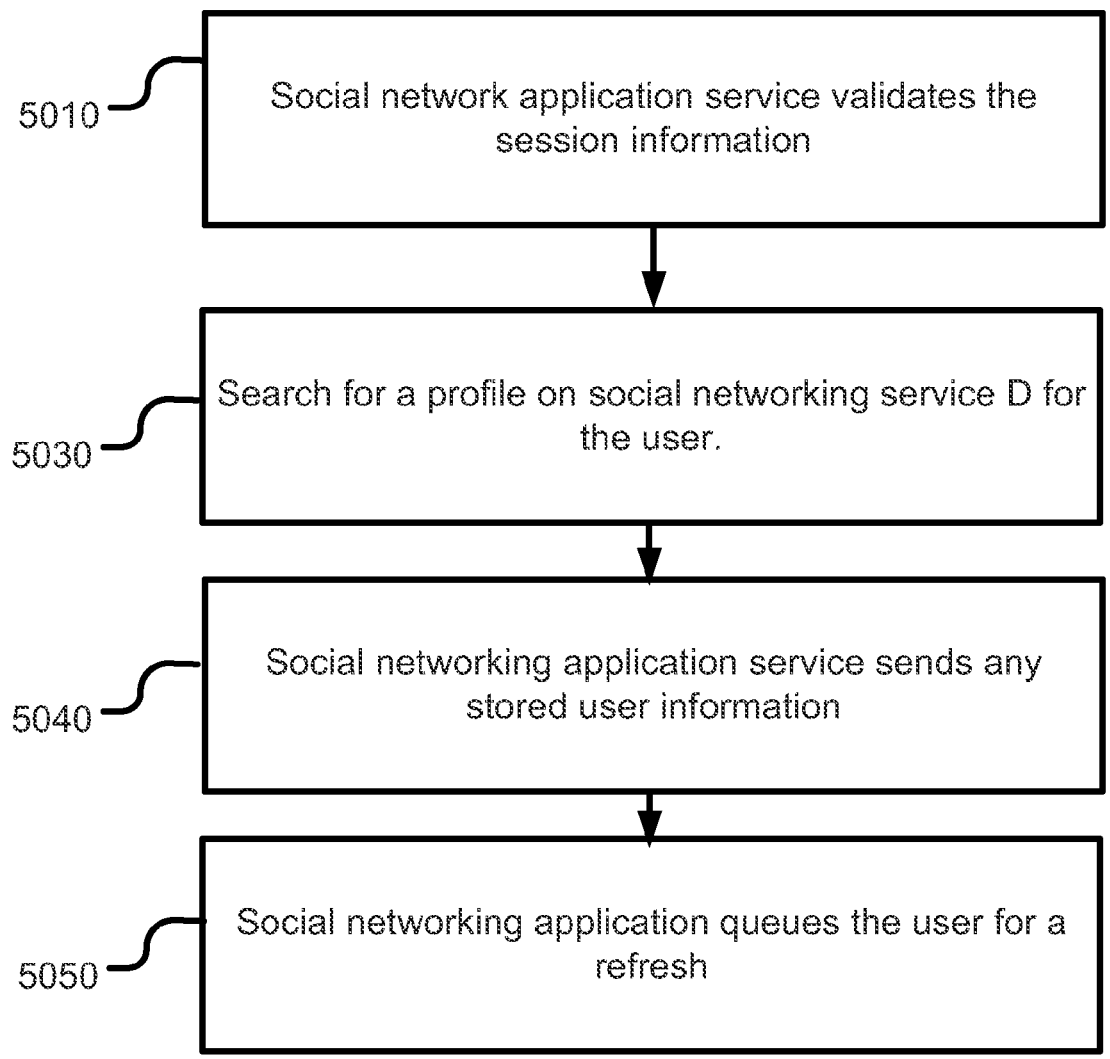
FIG. 5 is a flow chart illustrating a method for sending a social networking application information about a user according to one example of the present disclosure.

FIG. 5 shows one example server authentication module method. At operation 5010, the server authentication module 1100 validates the authentication information sent by client authentication module 2010. This validation process, in some examples, is the same or similar to that of client authentication module 2010. Server authentication module 1100 then may pass the authentication information and any information about the user sent from social networking application 1070 to social networking service D 1120.

At 5030, the social networking application service may attempt to locate a social networking service D 1120 profile for the user 1080 in order to store the authentication information in the profile for later use in making API calls to the host social networking service to update profile information. In order to locate the correct profile, any piece of information stored in the profile may be compared to any identifying information sent from the social networking application 1070 about the user along with the social networking service authentication information. For example, if user 1080 launches social networking application 1070 from FACEBOOK®, in some examples, social networking application 1070 will pass the FACEBOOK® id of user 1080 to the social networking service 1090 along with the authentication information. The social networking service D 1120 may then parse the member profiles to find a user that has that FACEBOOK® id associated with it. In other examples, social networking application service 1090 or social networking application 1070 may utilize the authentication information to query the host social networking service for information about the user 1080.

Other identification information may be used to associate user 1080 with a profile. Some information may include member ID, name, social graphs (common friends), address, phone number, email address, TWITTER® account, website links, bank accounts, credit card information, and any other personal identifiable information. In yet other cases, the social networking application 1070 may prompt user 1080 to associate himself or herself with the various profiles on the various social networking services 1010-1030, 1120 to build this aggregated profile.

In still other examples, social networking application 1070 may send a unifying id (if known) to social networking service D 1120 along with the authentication information. A unifying identification is an id assigned to the user by social networking service D 1120 when the user becomes associated with social networking service D 1120. The id allows the social networking application 1070, social networking application service 1090 and social networking service D 1120 to utilize one identification for a user such that the system may easily identify a particular member. This unifying id links to the user 1080's profile on social networking service D 1120 that contains an aggregation of all the information collected from the various social networking services 1010-1030 about the user 1080, including the various user identifications specific to those social networking services. For example, the social networking data store may store the user's FACEBOOK® member id, a LINKEDIN® member id, and the like tied together with a unifying id. Once the system either associates the user with a previous profile stored in social networking application service D 1120 or creates a new profile, the user can subsequently be identified by the social networking application service 1090 and application 1070 by this identification.

At operation 5050, if a profile is found, the social networking application service 1090 may send to the social networking application 1070 user 1080's profile, or a portion of it that social networking application 1070 is likely to use without social networking application 1070 having to separately request the information. In some examples, this may include connection lists. In other examples, social networking application service 1090 may store social networking application 1070 preferences describing the information that particular social networking application 1070 is interested in, so that social networking application service 1090 may provide only the information necessary.

Figure 6:
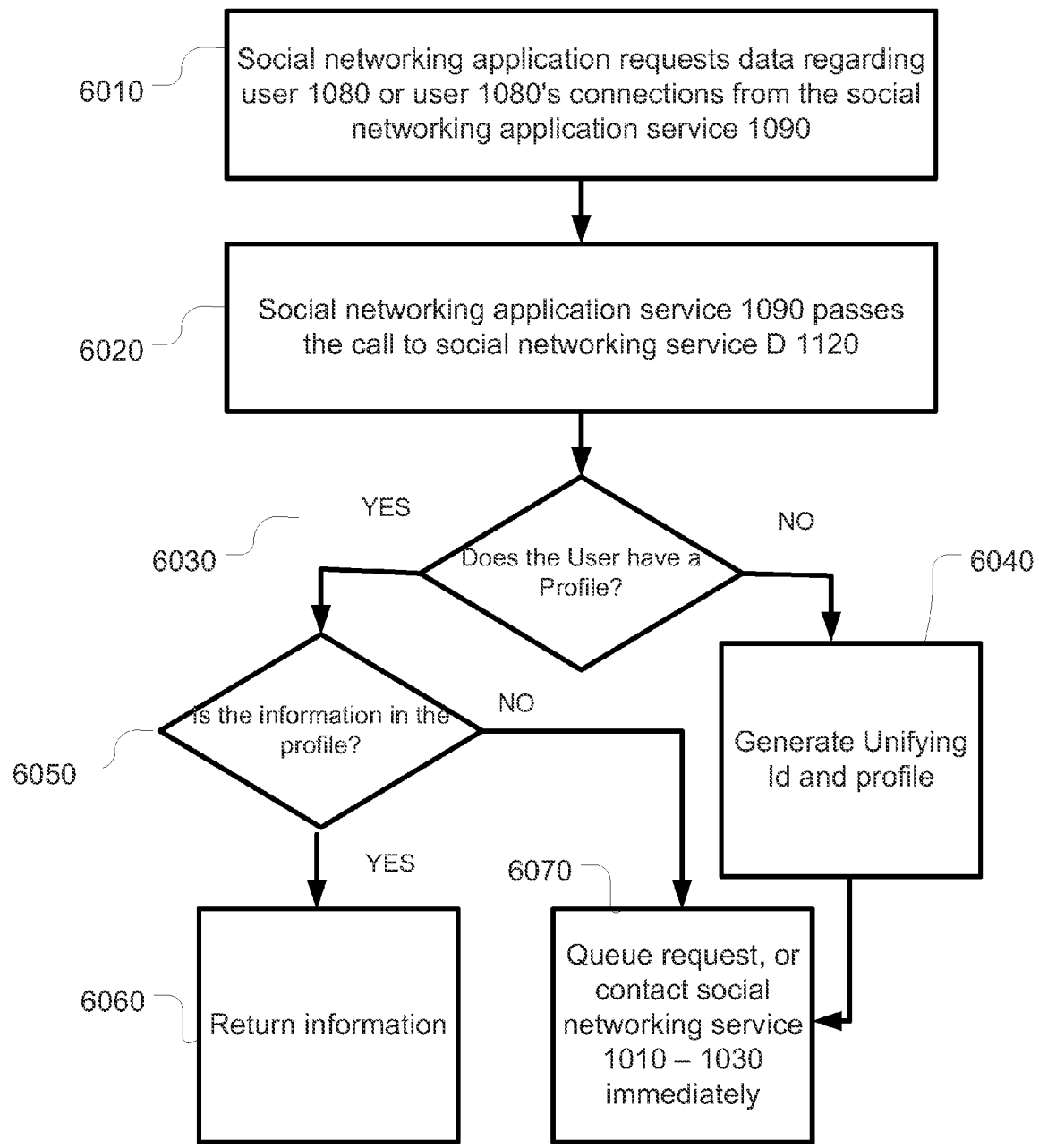
FIG. 6 is a flow chart illustrating a method for obtaining information about a user of a social networking service according to one example of the present disclosure.

FIG. 6 shows one example of a request for data from a social networking application 1070. In some examples, at 6010, social networking application requests data regarding the user 1080 or some other user from the social networking application service 1090. At 6020, the social networking application service 1090 passes the call to social networking service D 1120. In other examples, social networking application may request the data directly from social networking service D 1120. At 6030, the social networking application service searches the data store for the user's profile. If the profile is not found, one is created at 6040 and any information sent from social networking application 1070 about the user is inserted into the profile. The request for information is then placed in the queue or immediately requested at 6070. If a profile is found at 6030, then a check is made to see if the information in the profile will satisfy the social networking application 1070's request at 6050. If it will, then the information is returned at 6060. If not, then the request is queued or immediately requested from the social networking service 1010-1030 at 6070. In other examples, rather than return the information, the system may determine the age of the data and in some examples wait for a data update prior to returning the data if the data is too old, and in other examples, send the old data but queue an update. In still other examples, the social networking application service 1090 or social networking service D 1120 can reply that no information, or old information was found and instructions for social networking application 1070 to contact the social networking service 1010-1030 itself for the information.

Figure 7:
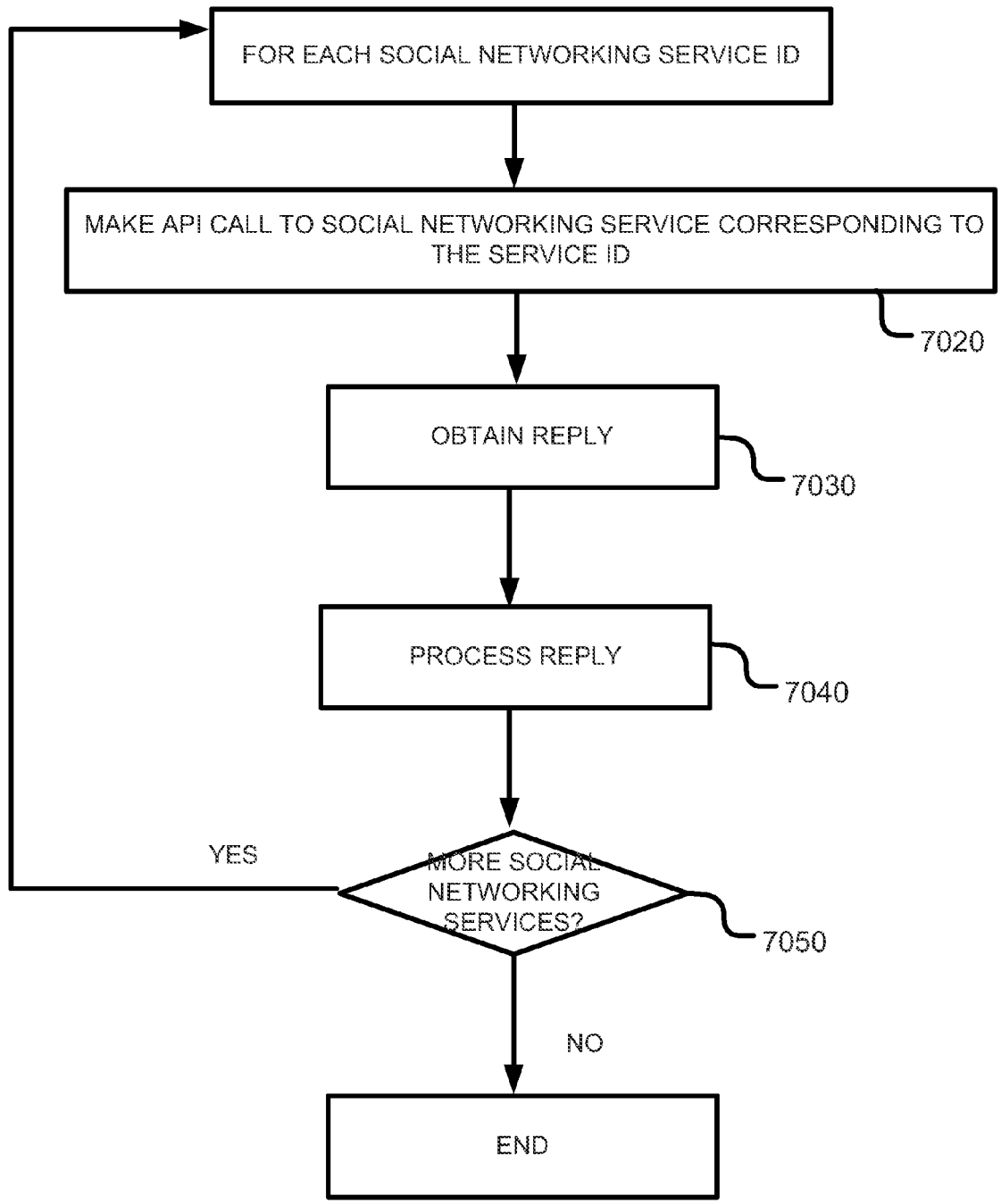
FIG. 7 is a flow chart illustrating a method to update information about a user of a social networking service according to one example of the present disclosure.

Turning now to FIG. 7, when an item is taken off of the queue for processing, or immediately processed, for each social networking service 1010-1030 that the system has associated with the user (e.g. for each social networking service to which an id is present in the user's profile) the synch module 1140 of social networking application service 1090 makes an API call to the social networking service 1010-1030 to obtain the requested information at 7020. In some examples, the social networking service D 1120 may use the authentication information for the social networking services 1010-1030 that was sent by a social networking application 1070 earlier and stored in the user's profile, if available, to utilize the requisite APIs. In other examples, other user's authentication information may allow social networking service D 1120 access to the requested information (e.g. if the social networking service may allow the application access to certain profile information of connections associated with the user whose authentication information is used, authentication information for connections of the user whose profile is to be updated may be used.) In some examples, this may be a request for information from a user's profile including a list of connections for a user, personal information, postings, or the like. At 7030, the system receives the reply and processes the reply at 7040. This process may be repeated at 7050 for each social networking service to which the user is a member. While all social networking services to which the system has associated with the user may be contacted, in yet other examples, only certain social networking services may be contacted, rather than all of the social networking services connected to that profile.

Figure 8:
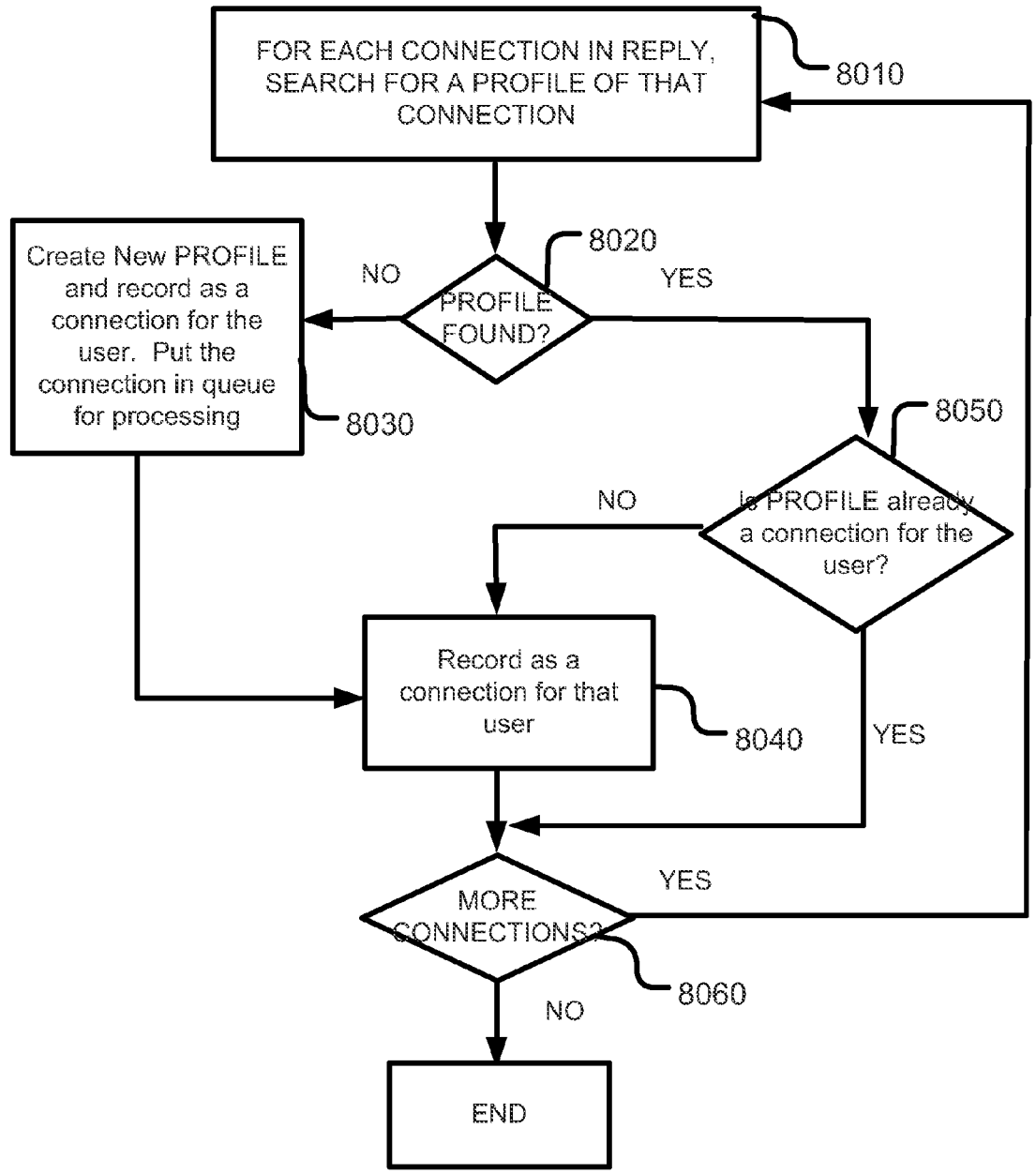
FIG. 8 is a flow chart illustrating a method of updating information about a user of a social networking service according to one example of the present disclosure.

Turning now to FIG. 8, a method for processing a reply, or part of a reply is shown. Once the reply is obtained, if the information is or includes a list of that user's connections, each connection is searched at 8010 to determine if that connection has a social networking service D 1120 profile. The same methods and indicators utilized to search for a profile discussed with respect to FIGS. 5 and 6 may be utilized.

If a profile for that connection is not found, at operation 8020 a profile is created and filled in based on the information known about the connection (e.g. social networking service user id, and the like) at operation 8030, and the profile of the user on social networking service D 1120 is updated to reflect this connection at operation 8040. At this time a unifying id is also created. The unifying id is a unique identification for that member on social networking service D 1120.

If the profile was found, at 8050 the system checks to see if that connection is already associated with the particular user whose profile is being updated. In some examples, if the connections in the profiles of social networking service D 1120 are stored as unifying ids, the system may simply compare the unifying id of the profile found in operation 8020 with the stored unifying ids of the connections of the user whose profile is being updated to determine if the connection is already present. In other examples, the connections may be stored by the native social networking id of the social network to which the connection pertains. For example, if the connection is a FACEBOOK® connection, the connection may be stored as a FACEBOOK® user id in the connection section of the social networking service D 1120 profile. In this case, the system may determine if the connection already exists by attempting to match any of the already stored connections in the social networking service D 1120 profile for the user whose profile is being updated with any identification information for any social networking services 1010-1030 stored in the social networking service D 1120 profile of the reported connection. Thus, if the reply indicates that the user 1080 is connected with a user with FACEBOOK® userid "1234," the system may check all the connections stored in the profile of user 1080 on social networking service D 1120 and determine whether any of them, regardless of what social networking service the connection is from, are also associated with FACEBOOK® userid "1234." For example, user 1080 may be connected to another user via. LinkedIn® with userid "5678." User "5678" on LinkedIn® may also be user "1234" on FACEBOOK® and thus user 1080 is already connected with this other user. The system can determine this by searching the social networking service D 1120 user profile which is associated with FACEBOOK® id "1234" for any other social networking service identifications associated with that user and comparing all those with connections of user 1080.

If the connection is not already made, at operation 8040 that connection is associated with that user by noting the association in the user's social networking service D 1120 profile. Continuing on, the system continues to parse the response. If more connections are present at 8060, then operations s 8010-8060 may be repeated until no more connections are present. In this way, the social networking service D 1120 may have up to date information on the list of a user 1080's connections across multiple social networking services.

Figure 9:
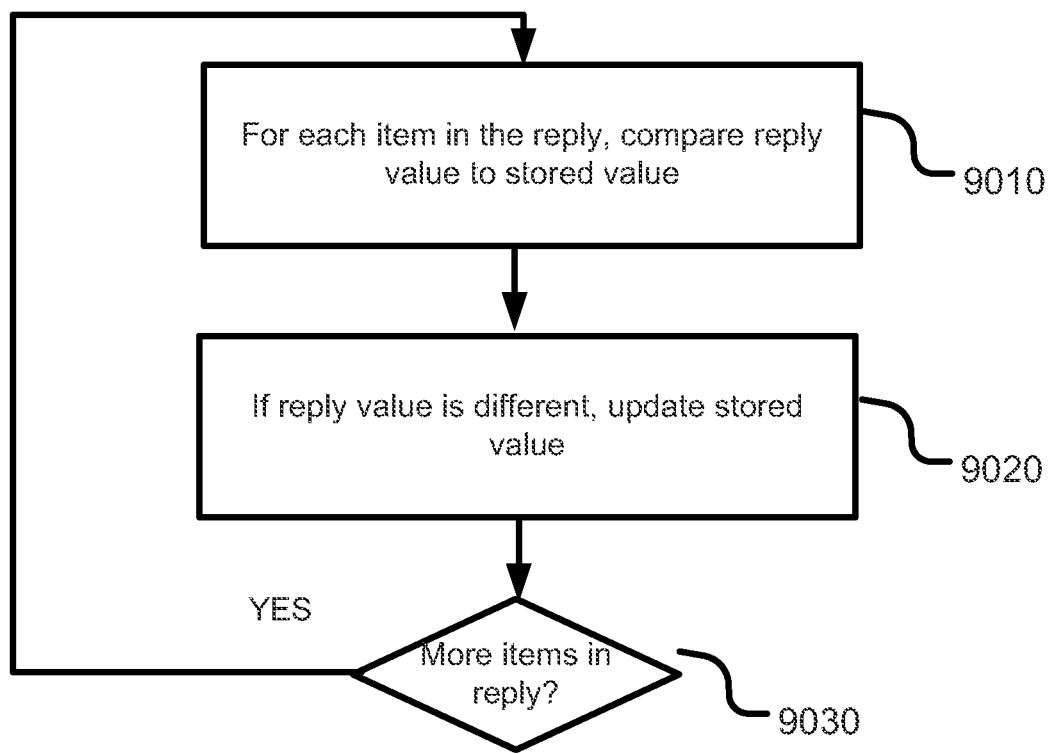
FIG. 9 is a flow chart illustrating a method of updating information about a user of a social networking service according to one example of the present disclosure.

While FIG. 8 showed one method of processing the response from each social networking service for connection information, FIG. 9 shows another example for profile information, such as for example, name, contact info, and the like. At operation 9010, each item in the reply is compared with the value stored in the social networking service D 1120 profile of the user. Thus for example, an email address may be compared with the email address stored in the social networking service D 1120 profile. At operation 9020, if the information in the reply is different then what is stored in the profile the stored value may be updated with the reply value. The reply is checked for more items in operation 9030, and if more items are found, operations 9010-9030 are repeated for each item. In some examples, the value stored in the profile may be replaced with the value in the reply, but in other examples, both may be stored. In some examples in which both information is stored, an indication may also be stored as to which social networking service that particular piece of information was retrieved from.

Figure 10:
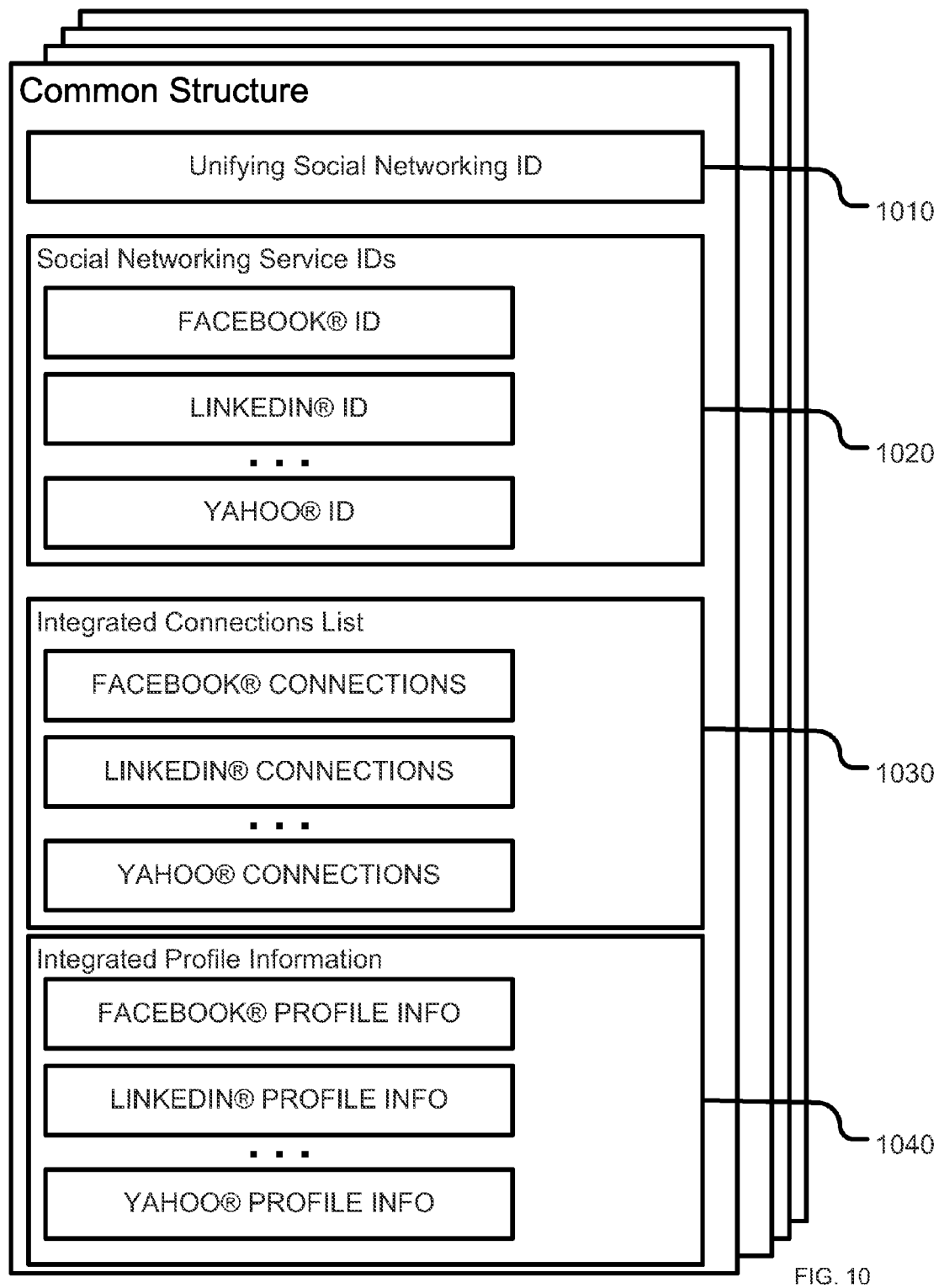
FIG. 10 is block diagram illustrating a data structure for storing user information according to one example of the present disclosure.

FIG. 10 shows an example data structure that may be part of the social networking service D 1120 profile. In some examples, this structure may store the unifying id 10010, a list of the social networking service IDs 10020 (e.g. the FACE-BOOK® user id, the LINKEDIN® user id, and the like), a list of all the connections of the user 10030 and in some examples the social networking service to which that connection pertains, and integrated profile information 10040. In other examples, the data structure may also store authentication and authorization information for the various social networking services 1010-1030 to which the user is associated. While the data structure illustrated in FIG. 10 shows connections stored by social networking service, in other examples, the connections may be stored by unifying id.

Note that in some examples, social networking service D 1120 may provide all the functionality of social networking services 1010-1030. This includes in some examples the ability for members to create and edit profiles, view profiles, view others profiles, make connections, post messages for other members, and the like. In some examples, social networking service D 1120 may provide an API for other social networking applications.

Other Notes and Examples

Disclosed in one example is a system for providing social networking data including a data store configured to store a user profile. The user profile may be associated with a first user and may include a user identification, a first social networking user identifier associated with the first user for a first social networking service, and a second social networking user identifier associated with the first user for a second social networking service. The data store also may store a first connection between a second user and the first user on the first social networking service and a second connection between a third user and the first user on the second social networking service. The system may include a response module configured to respond to a request for information from a social networking application. The request for information may request information relating to the first user, and the response module may respond with at least a portion of the profile associated with the first user if it is present in the data store. If the profile is not present in the data store, the response module may be configured to create a new profile associated with the first user and add it to the data store. The system may include a synchronization module to periodically request updated information from the first or second social networking services for the first user and to use the updated information to update the profile associated with the first user.

Disclosed in another example is a method to provide social networking data including storing a user profile. The user profile may be associated with a first user and may include a first social networking user identifier associated with the first user for a first social networking service, a second social networking user identifier associated with the first user for a second social networking service, a first connection between a second user and the first user on the first social networking service, and a second connection between a third user and the first user on the second social networking service. The method may also include responding to a request for information from a social networking application with at least a portion of the profile associated with the first user based on a determination that the profile exists in the data store, and creating a new profile associated with the first user and adding it to the data store based on a determination that the profile does not exist in the data store. The method may also include periodically requesting updated information from at least one of the first social networking service and the second social networking service for the first user and to use the updated information to update the profile associated with the first user.

Disclosed in another example is a machine readable medium that stores instructions which when performed by a machine, causes the machine to store a user profile. The user profile may be associated with a first user and may include a first social networking user identifier associated with the first user for a first social networking service, a second social networking user identifier associated with the first user for a second social networking service, a first connection between a second user and the first user on the first social networking service, and a second connection between a third user and the first user on the second social networking service. The instructions may also include instructions which cause the machine to respond to a request for information from a social networking application with at least a portion of the profile associated with the first user based on a determination that the profile exists in the data store, and create a new profile associated with the first user and add it to the data store based on a determination that the profile does not exist in the data store. The instructions may also include instructions which cause the machine to periodically request updated information from at least one of the first social networking service and the second social networking service for the first user and to use the updated information to update the profile associated with the first user.

These examples maybe combined in any permutation or combination. This non-limiting summary is intended to provide an overview of subject matter of the present patent application. It is not intended to provide an exclusive or exhaustive explanation of the invention. The detailed description is included to provide further information about the present patent application.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

Figure 11:
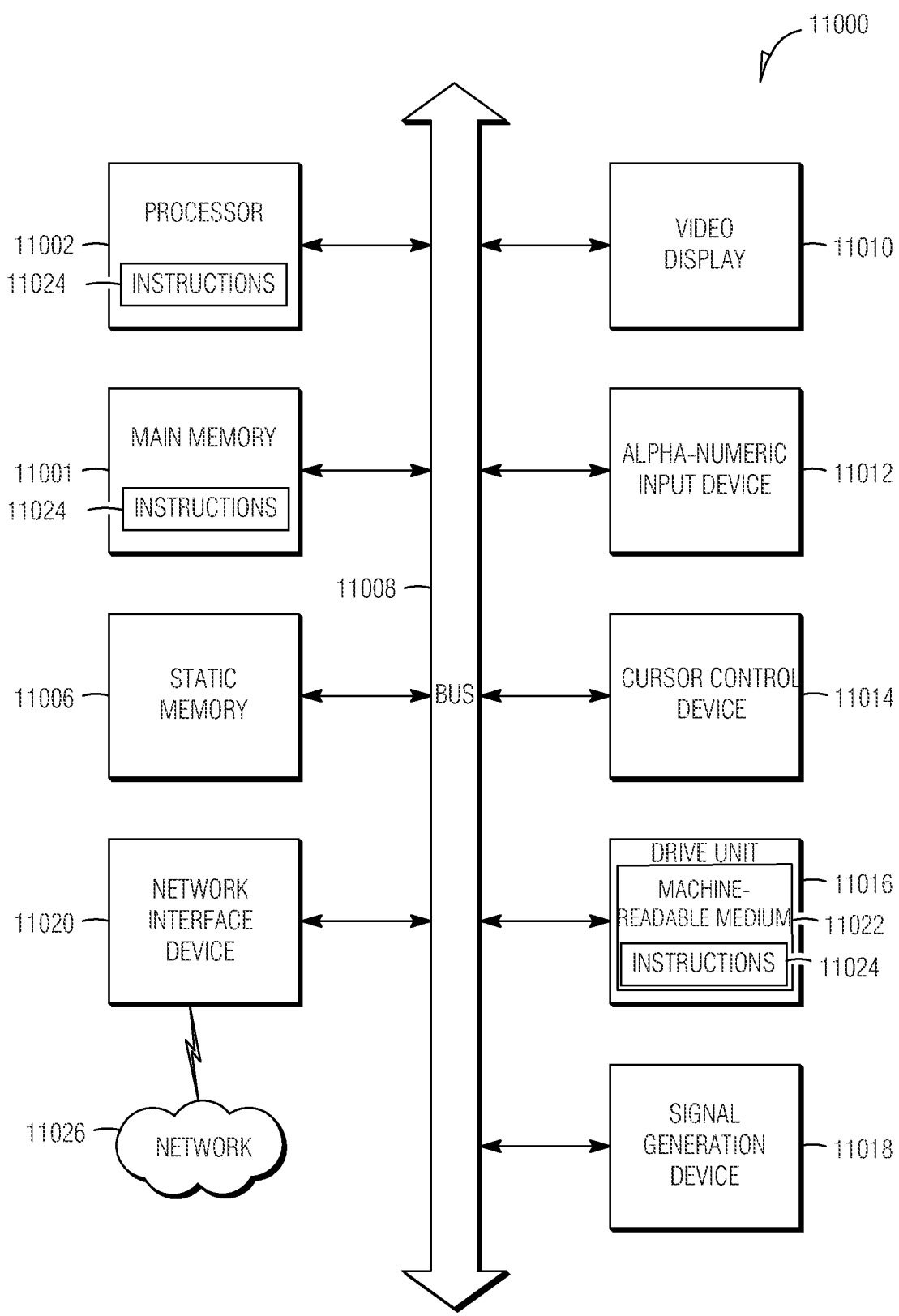
FIG. 11 is a block diagram illustrating a machine implementation according to one example of the present disclosure.

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments, Example Computer Architecture FIG. 11 shows a diagrammatic representation of a machine in the example form of a computer system 11000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 11000 includes a processor 11002 (e.g., a Central Processing Unit (CPU), a Graphics Processing Unit (GPU) or both), a main memory 11001 and a static memory 11006, which communicate with each other via a bus 11008. The computer system 11000 may further include a video display unit 11010 (e.g., a Liquid Crystal Display (LCD) or a Cathode Ray Tube (CRT)). The computer system 11000 also includes an alphanumeric input device 11012 (e.g., a keyboard), a User Interface (UI) cursor controller 11014 (e.g., a mouse), a disk drive unit 11016, a signal generation device 11018 (e.g., a speaker) and a network interface device 11020 (e.g., a transmitter).

The disk drive unit 11016 includes a machine-readable medium 11022 on which is stored one or more sets of instructions 11024 and data structures (e.g., software) embodying or used by any one or more of the methodologies or functions illustrated herein. The software may also reside, completely or at least partially, within the main memory 11001 and/or within the processor 11002 during execution thereof by the computer system 11000, the main memory 11001 and the processor 11002 also constituting machine-readable media.

The instructions 11024 may further be transmitted or received over a network 11026 via the network interface device 11020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method for providing aggregated social networking information, the method comprising using one or more processors for operations including:

sending a first social networking application, over a computer network, to a user, the first social networking application associated with a first social networking service, the first social networking service provided by a first server;

receiving first authentication information obtained from a session established between the first social networking service and the first social networking application;

receiving a request from the first social networking application for social networking information about the user;

receiving, over a network, second authentication information associated with the user from a second social networking application, the second social networking application associated with, and authenticating with, a second social networking service, the second social networking service provided by a second server, the second social networking application being a different application than the first social networking application;

requesting, over the network, first social networking information about the user from the first social networking service, using the first authentication information;

requesting, over the network, second social networking information about the user from the second social networking service, using the second authentication information; and sending to the first social networking application, the first and second social networking information about the user.

2. The method of claim 1, wherein the first social networking application provides a gaming application to the user.

3. The method of claim 2, wherein the second social networking application provides a gaming application with game play that is substantially similar to the game play of the first social networking application.

4. The method of claim 2, wherein the second social networking application provides a gaming application with game play that is different than the game play of the first social networking application.

5. The method of claim 1, comprising: sending the second social networking application, over the network, to the user.

6. The method of claim 1, comprising: periodically requesting updated information from at least one of the first social networking service and the second social networking service for the user.

7. The method of claim 1, comprising: creating a profile for the user based upon the first and second social networking information.

8. A system for providing aggregated social networking information, the system comprising one or more processors configured to include:
   an application module configured to:
      send a first social networking application, over a computer network, to a user, the first social networking application associated with a first social networking service, the first social networking service provided by a first server;
   an authentication module configured to:
      receive first authentication information obtained from a session established between the first social networking service and the first social networking application;
      receive, over a network, second authentication information associated with the user from a second social networking application, the second social networking application associated with, and authenticating with, a second social networking service, the second social networking service provided by a second server, the second social networking application being a different application than the first social networking application;
   a synchronization module configured to:
      receive a request from the first social networking application for social networking information about the user;
      request, over the network, first social networking information about the user from the first social networking service, using the first authentication information;
      request, over the network, second social networking information about the user from the second social networking service, using the second authentication information; and
      send to the first social networking application, the first and second social networking information about the user.

9. The system of claim 8, wherein the first social networking application is configured to provide a gaming application to the user.

10. The system of claim 9, wherein the second social networking application is configured to provide a gaming application with game play that is substantially similar to the game play of the first social networking application.

11. The system of claim 9, wherein the second social networking application is configured to provide a gaming application with game play that is different than the game play of the first social networking application.

12. The system of claim 8, wherein the application module is configured to send the second social networking application, over the network, to the user.

13. The system of claim 8, wherein the synchronization module is configured to periodically request updated information from at least one of the first social networking service and the second social networking service for the user.

14. The system of claim 8, comprising a social networking service module configured to create a profile for the user based upon the first and second social networking information.

15. A machine readable medium that is not a transitory propagating signal including instructions, which when performed by a machine, cause the machine to perform the operations comprising:
   sending a first social networking application, over a computer network, to a user, the first social networking application associated with a first social networking service, the first social networking service provided by a first server;
   receiving first authentication information obtained from a session established between the first social networking service and the first social networking application;
   receiving a request from the first social networking application for social networking information about the user;
   receiving, over a network, second authentication information associated with the user from a second social networking application, the second social networking application associated with, and authenticating with, a second social networking service, the second social networking service provided by a second server, the second social networking application being a different application than the first social networking application;
   requesting, over the network, first social networking information about the user from the first social networking service, using the first authentication information;
   requesting, over the network, second social networking information about the user from the second social networking service, using the second authentication information; and
   sending to the first social networking application, the first and second social networking information about the user.

16. The machine-readable medium of claim 15, wherein the first social networking application provides a gaming application to the user.

17. The machine-readable medium of claim 16, wherein the second social networking application provides a gaming application with game play that is substantially similar to the game play of the first social networking application.

18. The machine-readable medium of claim 16, wherein the second social networking application provides a gaming application with game play that is different than the game play of the first social networking application.

19. The machine-readable medium of claim 15, wherein the instructions comprise instructions, which when performed by the machine cause the machine to perform the operation of: sending the second social networking application, over the network, to the user.

20. The machine-readable medium of claim 15, wherein the instructions comprise instructions, which when performed by the machine cause the machine to perform the operation of: periodically requesting updated information from at least one of the first social networking service and the second social networking service for the user.

21. The machine-readable medium of claim 15, wherein the instructions comprise instructions, which when performed by the machine cause the machine to perform the operation of: creating a profile for the user based upon the first and second social networking information.

* * * * *

UNITED STATES PATENT AND TRADEMARK OFFICE
CERTIFICATE OF CORRECTION

PATENT NO. : 8,745,134 B1  
APPLICATION NO. : 13/077440  
DATED : June 3, 2014  
INVENTOR(S) : Dale et al.

Page 1 of 2

It is certified that error appears in the above-identified patent and that said Letters Patent is hereby corrected as shown below:

In the Specification

In column 3, line 49, delete "interact" and insert --internet--, therefor

In column 4, line 1, delete "flash" and insert --Flash--, therefor

In column 4, line 1, delete "network" and insert --networking services--, therefor In column 4, line 7, before "application", insert --social networking--, therefor In column 4, line 27, before "application", insert --social networking--, therefor In column 4, line 53, delete "networks" and insert --networking services--, therefor In column 6, line 3, delete "1100" and insert --1110--, therefor In column 6, line 5, delete "networks" and insert --networking services--, therefor In column 6, line 16, after "utilize", insert --the--, therefor In column 6, line 41, delete "1100" and insert --1110--, therefor In column 7, line 38, before "service", insert --application--, therefor In column 7, line 61, after "The", insert --unifying--, therefor In column 8, line 5-6, delete "like tied" and insert --like-all tied--, therefor In column 12, line 10, after "portion", insert --)--, therefor Signed and Sealed this  
Tenth Day of February, 2015

Michelle K. Lee  
*Deputy Director of the United States Patent and Trademark Office*

In column 12, line 27, after "software", insert --)--, therefor

In column 13, line 2, before "a", insert --(e.g.,--, therefor

In column 13, line 31, after "APIs)", insert --)--, therefor

In column 13, line 41, after "of", insert --,--, therefor

In column 14, line 9, delete "embodiments," and insert --embodiments.--, therefor In column 15, line 59, delete "in" and insert --In--, therefor In the Claims In column 18, line 1, in Claim 14, after "comprising", insert --:--, therefor